J. A. Fay,
Horse Power.
Nº 978.  Patented Oct. 10, 1838.
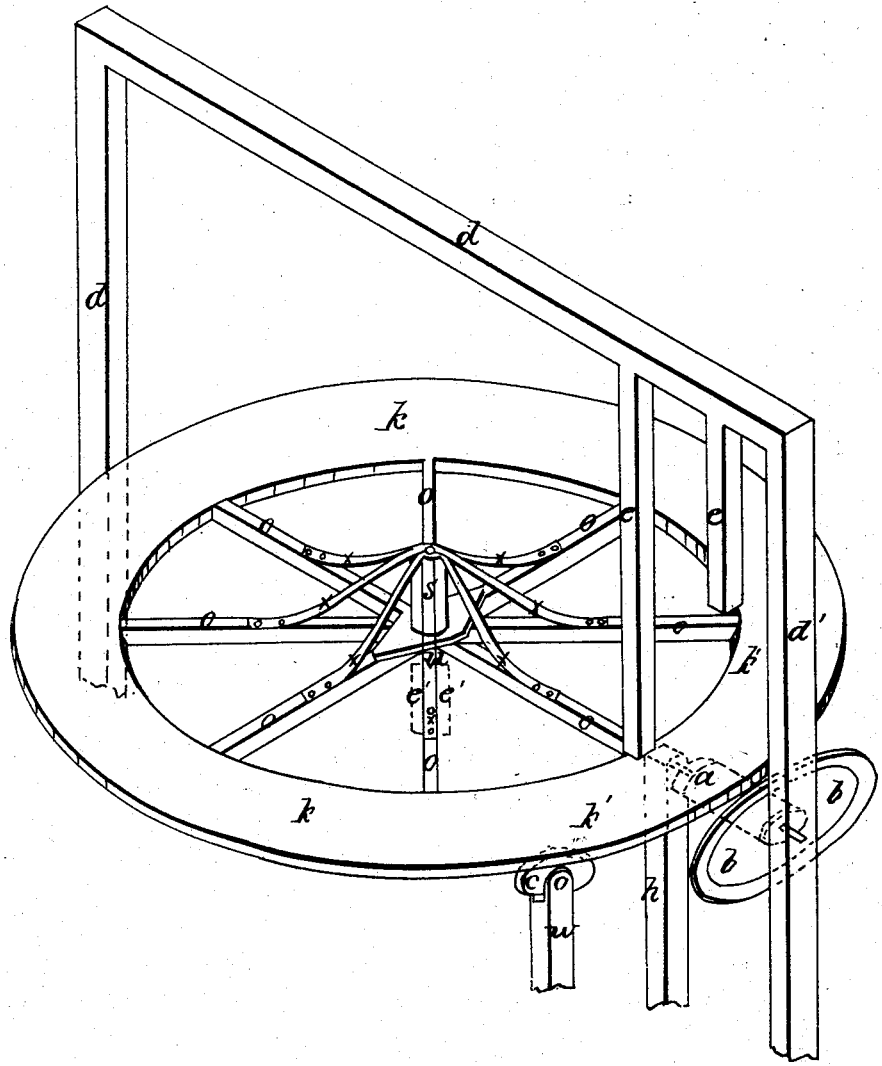

UNITED STATES PATENT OFFICE.

JACOB A. FAY, OF BALTIMORE, MARYLAND.

HORSE-POWER.

Specification of Letters Patent No. 978, dated October 10, 1838.

*To all whom it may concern:*

Be it known that I, JACOB A. FAY, of the city of Baltimore, in the State of Maryland, have invented an Improvement in Machines for Applying the Power of Horses or of other Animals to the Propelling of Machinery; and I do hereby declare that the following is a full and exact description thereof.

In the accompanying drawing $k$, $k$, represents the upper face of a flat wheel, upon which the horse, or other animal is to walk. This wheel may be placed horizontally, or it may be somewhat inclined to the horizon, so as to cause the weight of the animal upon it to tend to give it motion. $o$, $o$, $o$, are the arms of this wheel. Iron straps, or braces, $x$, $x$, $x$, are employed to brace or support these arms, $y$, being a standard, or vertical block, rising from the center of the wheel, for these iron braces to rest upon. A vertical block, or standard, $s$, $s$, is placed below the center of the wheel, being either fixed in the ground, or rising from the frame of the machine, as the case may be. A pointed, or other formed center pin $u$, rests on a step prepared to receive it, on the upper end of the block, $s$, $s$, thus sustaining the wheel at its center.

The horse is to be placed on that part of the wheel marked $k'$, $k'$, where the lower side of the wheel rests upon a friction roller; or trundle $a$, the gudgeons of which run in the upright $d'$ of the frame $d$, $d$, and in the port $h$; upon the axis of this trundle is the whirl, or band wheel $b$, $b$, from which the power is to be conveyed to whatever is to be driven by the power of the animal, which is to be attached to the ports $e$, $e$, to keep him in his position, two friction wheels $c$, upon posts $w$, are placed under the wheel $k$, $k$, at equal distance from the trundle $a$, to sustain the wheel, and prevent its tipping, but they must not stand so high as to interfere with the bearing of the wheel upon the trundle or friction roller.

$d$, $d$, $d$, is the frame of the machine, which may be put together in any convenient manner, as may be preferred.

By the particular manner in which I have combined together the respective parts of my horse power the weight and draft of the animal is to give motion to machinery by the friction of the tread wheel upon a roller, or trundle as above described, without the use of cogs, or any similar gearing. I do not however claim the driving by means of friction, without the employment of cogs, this having been previously effected, but What I do claim is—

The manner in which I have constructed and combined together the respective parts of my apparatus as above described; that is to say, I claim the manner of balancing the wheel upon which the horse is to walk, on its center, without a vertical shaft, in combination with the mode of bracing the same, and of sustaining the part on which the animal is to walk.

JACOB A. FAY.

Witnesses:
  I. L. MOGAME,
  GEO. F. COBB.